(12) United States Patent
Zamora Duran et al.

(10) Patent No.: US 10,990,982 B2
(45) Date of Patent: Apr. 27, 2021

(54) AUTHENTICATING A PAYMENT CARD

(71) Applicant: INTERNATIONAL BUSINESS MACHINES CORPORATION, Armonk, NY (US)

(72) Inventors: Edgar A. Zamora Duran, Heredia (CR); Franz F. Liebinger Portela, Heredia (CR); Roxana Monge Nunez, Perez Zeledon (CR); Sheyla V. Vargas, Hatillo (CR)

(73) Assignee: International Business Machines Corporation, New York, NY (US)

( * ) Notice: Subject to any disclaimer, the term of this patent is extended or adjusted under 35 U.S.C. 154(b) by 385 days.

(21) Appl. No.: 15/822,564

(22) Filed: Nov. 27, 2017

(65) Prior Publication Data

US 2019/0164160 A1    May 30, 2019

(51) Int. Cl.
*G06Q 20/40* (2012.01)
*G06Q 20/34* (2012.01)
(Continued)

(52) U.S. Cl.
CPC ..... *G06Q 20/409* (2013.01); *G06K 19/06187* (2013.01); *G06K 19/07* (2013.01);
(Continued)

(58) Field of Classification Search
CPC .............................. G06Q 20/40; G06Q 20/34
See application file for complete search history.

(56) References Cited

U.S. PATENT DOCUMENTS 6,196,459 B1  3/2001 Goman et al.
7,024,395 B1  4/2006 McCown et al.
(Continued)

FOREIGN PATENT DOCUMENTS

CA      2903341      10/2014
CN    106097073 A    11/2016
(Continued)

OTHER PUBLICATIONS

Notification of Transmittal of the International Search Report and the Written Opinion of the International Searching Authority, of the Declaration; dated Mar. 13, 2019; PCT/IB2018/059029; Filing Date Nov. 16, 2018; 9 pages.

(Continued)

*Primary Examiner* — Zeshan Qayyum
(74) *Attorney, Agent, or Firm* — Schmeiser, Olsen & Watts; Nicholas L. Cadmus (57) ABSTRACT

An approach is provided for authenticating a payment card. Information is read from the payment card being used for a purchase. The information includes an identifier and data on a chip, in braille cells, and in markings in the payment card. A hash read from the chip, the identifier, and security codes derived from the braille cells and the markings are sent to a payment system. A hash of an (n+1)-th block of a blockchain is received and recorded in the chip in response to validations of the hash as matching a hash of an n-th block of the blockchain, the identifier, and the first and second security codes, and a generation of the hash of the (n+1)-th block. Data about the purchase and the hash of the (n+1)-th block are sent to the payment system.

8 Claims, 9 Drawing Sheets

(51) Int. Cl.
| | |
|---|---|
| *G06K 19/07* | (2006.01) |
| *G06K 19/073* | (2006.01) |
| *G07F 7/08* | (2006.01) |
| *G06K 19/06* | (2006.01) |
| *G07F 7/12* | (2006.01) |
| *G06Q 20/38* | (2012.01) |
| *G06K 19/077* | (2006.01) |
| *G06Q 20/12* | (2012.01) |

(52) U.S. Cl.
CPC ..... *G06K 19/07309* (2013.01); *G06Q 20/341* (2013.01); *G06Q 20/343* (2013.01); *G06Q 20/353* (2013.01); *G06Q 20/3827* (2013.01); *G06Q 20/3829* (2013.01); *G07F 7/082* (2013.01); *G07F 7/0826* (2013.01); *G07F 7/0833* (2013.01); *G07F 7/122* (2013.01); *G06K 19/0772* (2013.01); *G06K 2019/06253* (2013.01); *G06K 2019/06271* (2013.01); *G06Q 20/12* (2013.01); *G06Q 2220/00* (2013.01)

(56) References Cited

U.S. PATENT DOCUMENTS

| | | | |
|---|---|---|---|
| D578,159 S | 10/2008 | Hachey et al. | |
| 7,778,935 B2 | 8/2010 | Colella | |
| 7,793,834 B2 | 9/2010 | Hachey et al. | |
| 8,256,667 B2 | 9/2012 | Poznansky et al. | |
| 9,208,493 B2 | 12/2015 | Perry, Sr. | |
| 9,215,331 B2 | 12/2015 | Febonio et al. | |
| 2004/0177045 A1* | 9/2004 | Brown ............. | G06K 19/07354 705/65 |
| 2016/0247143 A1* | 8/2016 | Ghosh ................ | G06Q 20/3226 |

FOREIGN PATENT DOCUMENTS

| | | |
|---|---|---|
| CN | 107070660 A | 8/2017 |
| CN | 107257336 A | 10/2017 |
| CN | 107257340 A | 10/2017 |

OTHER PUBLICATIONS

Kim, Youngsuk; Even Blind People Are Safe From Scams With Braille Credit Card; Tuvie; URL: http://www.tuvie.com/even-blind-people-are-safe-from-scams-with-braille-credit-card/; retrieved from the Internet Jan. 17, 2017. 6 pages.

Wikipedia; 3-D Secure; URL: https://en.wikipedia.org/wiki/3-D_Secure; retrieved from the Internet Jan. 17, 2017; 9 pages.

Muftic, Sead; Secure Payment Transactions Based on the Public Bankcard Ledger; BIX Bank Corporation White Paper; Jan. 2017; 17 pages.

Park, Chan-Ho et al.; Virtual Credit Card Number Payment System with Stored Hash Value for Efficient Authentication; Journal of the Korea Institute of Information Security and Cryptology, vol. 25, Issue 1; 2015; pp. 5-15.

SC Magazine; Two-Factor Authentication, Smart Cards, Tokens Reviews; URL: https://web.archive.org/web/20161028131022/http://www.scmagazine.c . . . ; retrieved from the Internet Nov. 27, 2017; 3 pages.

Patents Act 1977 Examination Report under Section 18(3); dated Jul. 27, 2020; Application No. GB2008473.7; 5 pages.

Amendment filed Aug. 5, 2020 in response to Patents Act 1977 Examination Report under Section 18(3); dated Jul. 27, 2020; Application No. GB2008473.7; 5 pages.

* cited by examiner

AUTHENTICATING A PAYMENT CARD

BACKGROUND

The present invention relates to authenticating a payment, and more particularly to certifying a payment card as being original.

The use of two-factor authentication to prove one's identity is based on the premise that an unauthorized actor is unlikely to be able to supply both factors required for access. In an authentication attempt, if at least one of the factors is missing or supplied incorrectly, the user's identity is not established with sufficient certainty and access to the asset being protected remains blocked. An authentication factor in a two-factor authentication scheme may include (1) a physical object in the possession of the user, such as a Universal Serial Bus (USB) stick with a secret token, a bank card, a key, etc.; (2) a secret known to the user, such as a password, personal identification number (PIN), transaction authentication number (TAN), etc.; or (3) a physiological or behavioral characteristic of the user (i.e., biometric identifier), such as a fingerprint, eye iris, voice, typing speed, pattern in key press intervals, etc.

A drawback of known two-factor authentication techniques that use a physical object is their reliance on a possibly false assumption that the original request using the physical object is coming from an authorized entity and the physical object is secure. With the widespread use of wireless, near-field communication (NFC), and radio frequency (RF) technology, the physical object may be easily cloned, which reduces the two-factor authentication to a single authentication factor based on, for example, a knowledge of a PIN number.

Furthermore, a chip and PIN payment card is vulnerable to PIN harvesting via electronic means.

Accordingly, there is a need for an authentication technique that certifies that the physical object that serves as one of the authentication factors is truly the original physical object, and not a digital copy of the physical object (e.g., a copy that was scanned using one of many known duplication technologies).

SUMMARY

In one embodiment, the present invention provides a method of authenticating a payment card. The method includes a computer reading information from the payment card being used for a purchase. The information includes an identifier of the payment card, data on a chip included in the payment card, data encoded in braille cells on the payment card, and data encoded in markings included in the payment card. The method further includes the computer decrypting the information read from the payment card using a decryption key included in the data encoded in the markings. The method further includes in response to a determination that the decryption key is a correct key and based on the decrypted information, the computer sending to a payment system (i) a hash read from the chip included in the payment card, (ii) the identifier of the payment card, (iii) a first security code printed on the payment card, and (iv) a second security code included in the data encoded in the braille cells. The method further includes the computer receiving from the payment system a hash of an (n+1)-th block of a blockchain ledger in response to the payment system (i) validating the hash sent to the payment system as matching a hash of an n-th block of the blockchain ledger, (ii) validating the identifier of the payment card, (iii) validating the first security code, (iv) validating the second security code included in the data encoded in the braille cells, and (v) generating the hash of the (n+1)-th block. The method further includes the computer recording the hash of the (n+1)-th block in the chip included in the payment card as an update of the hash that was read from the chip. The method further includes the computer sending data about the purchase and the hash of the (n+1)-th block to the payment system, which causes the payment system to (i) validate the hash of the (n+1)-th block which confirms the hash of the (n+1)-th block is recorded in the chip and (ii) add the data about the purchase as a transaction into the (n+1)-th block.

The aforementioned embodiment provides an authentication of a payment card that includes data encoded in braille cells included in the payment card where the data is not included in the chip or magnetic stripe of the payment card, which prevents a clone of the payment card from completing a transaction because the clone does not have braille cells or has braille cells whose data does not match the data encoded in the braille cells included in the original payment card. The aforementioned embodiment provides an authentication of a payment card that requires a reference to the most recent previous transaction in a block of a blockchain, which prevents a clone of the payment card from completing a transaction because the clone does not know what the reference should be at the time the clone is attempting to complete a transaction.

The advantages discussed above also apply to the computer system and computer program product embodiments, which are summarized below.

In one optional aspect of the present invention, the markings include a unique pattern of quantum dots in a dye on at least a portion of the payment card. The step of decrypting the information read from the payment card includes, based on the decryption key, decrypting data encoded in the unique pattern of the quantum dots. The decrypted data encoded in the unique pattern of the quantum dots identifies a person to whom the payment card is issued. The aforementioned aspect of the present invention advantageously provides a unique pattern or a portion of a unique pattern that identifies a particular payment card and which a bank or other payment system can use to identify the person to whom the payment card is issued. The aforementioned aspect also advantageously prevents cloning of the payment card because a photocopy of the payment card will not be able to copy the unique pattern of the quantum dots. Furthermore, the quantum dots present an economical barrier to cloning because placing nano scale items on a clone in exactly the same places as the quantum dots on the original payment card is cost-prohibitive.

In another optional aspect of the present invention, a fraudulent copy of the payment card is being used for a current purchase and a hash read from a chip in the fraudulent payment card is sent to the payment system. An indication is received that the transaction to complete the purchase is denied in response to the payment system (i) determining that data about a most recent purchase using the payment card previous to the current purchase is stored in an m-th block of the blockchain ledger and (ii) determining that the hash read from the chip included in the fraudulent copy of the payment card does not match a hash of the m-th block of the blockchain ledger. The aforementioned aspect of the present invention advantageously denies a transaction by a payment card that does not store the hash of a block in a blockchain ledger specifying the last validated transaction using the payment card, thereby identifying the card as a fraudulent clone of the original card.

In another optional aspect of the present invention, the step of reading the information from the payment card includes reading the data encoded in the braille cells and reading the data encoded in the markings without any portion of the data encoded in the braille cells and the data encoded in the markings being stored in the chip or on a magnetic stripe of the payment card. The aforementioned optional aspect advantageously prevents malicious entities from obtaining the information encoded in the braille cells and the markings by reading at a distance or otherwise obtaining information on a chip or magnetic stripe of the payment card.

In another embodiment, the present invention provides a computer program product for authenticating a payment card. The computer program product includes a computer readable storage medium. Program instructions are stored on the computer readable storage medium. The computer readable storage medium is not a transitory signal per se. The program instructions are executed by a central processing unit (CPU) of a computer system to cause the computer system to perform a method. The method includes the computer system reading information from the payment card being used for a purchase. The information includes an identifier of the payment card, data on a chip included in the payment card, data encoded in braille cells on the payment card, and data encoded in markings included in the payment card. The method further includes the computer system decrypting the information read from the payment card using a decryption key included in the data encoded in the markings. The method further includes in response to a determination that the decryption key is a correct key and based on the decrypted information, the computer system sending to a payment system (i) a hash read from the chip included in the payment card, (ii) the identifier of the payment card, (iii) a first security code printed on the payment card, and (iv) a second security code included in the data encoded in the braille cells. The method further includes the computer system receiving from the payment system a hash of an (n+1)-th block of a blockchain ledger in response to the payment system (i) validating the hash sent to the payment system as matching a hash of an n-th block of the blockchain ledger, (ii) validating the identifier of the payment card, (iii) validating the first security code, (iv) validating the second security code included in the data encoded in the braille cells, and (v) generating the hash of the (n+1)-th block. The method further includes the computer system recording the hash of the (n+1)-th block in the chip included in the payment card as an update of the hash that was read from the chip. The method further includes the computer system sending data about the purchase and the hash of the (n+1)-th block to the payment system, which causes the payment system to (i) validate the hash of the (n+1)-th block which confirms the hash of the (n+1)-th block is recorded in the chip and (ii) add the data about the purchase as a transaction into the (n+1)-th block.

In another embodiment, the present invention provides a computer system including a central processing unit (CPU); a memory coupled to the CPU; and a computer readable storage device coupled to the CPU. The storage device includes instructions that are executed by the CPU via the memory to implement a method of authenticating a payment card. The method includes the computer system reading information from the payment card being used for a purchase. The information includes an identifier of the payment card, data on a chip included in the payment card, data encoded in braille cells on the payment card, and data encoded in markings included in the payment card. The method further includes the computer system decrypting the information read from the payment card using a decryption key included in the data encoded in the markings. The method further includes in response to a determination that the decryption key is a correct key and based on the decrypted information, the computer system sending to a payment system (i) a hash read from the chip included in the payment card, (ii) the identifier of the payment card, (iii) a first security code printed on the payment card, and (iv) a second security code included in the data encoded in the braille cells. The method further includes the computer system receiving from the payment system a hash of an (n+1)-th block of a blockchain ledger in response to the payment system (i) validating the hash sent to the payment system as matching a hash of an n-th block of the blockchain ledger, (ii) validating the identifier of the payment card, (iii) validating the first security code, (iv) validating the second security code included in the data encoded in the braille cells, and (v) generating the hash of the (n+1)-th block. The method further includes the computer system recording the hash of the (n+1)-th block in the chip included in the payment card as an update of the hash that was read from the chip. The method further includes the computer system sending data about the purchase and the hash of the (n+1)-th block to the payment system, which causes the payment system to (i) validate the hash of the (n+1)-th block which confirms the hash of the (n+1)-th block is recorded in the chip and (ii) add the data about the purchase as a transaction into the (n+1)-th block.

DETAILED DESCRIPTION

Overview

Embodiments of the present invention authenticate a physical object provided in a two-factor authentication system as being the original object (i.e., not a copy of the original object). In one embodiment, the physical object is a secure accessible payment card which includes (1) braille elements and randomly placed markings to provide user information and to provide a key to decode information and (2) partial information on a magnetic strip and/or a chip in the card, which does not include at least a portion of the information provided by the braille elements and the randomly placed markings. In one embodiment, a payment card authentication system includes a card reader that is able to read the braille elements and the markings and store a hash in the chip of the card. In one embodiment, records managed by a bank entity or other payment system identify payment cards issued for visually impaired users. In one embodiment, a blockchain ledger is provided for transactions of the payment card owner, along with means to record transactions in blocks of the blockchain ledger, where new blocks are marked according to transaction type (i.e., whether the transactions are executed in a card reader or in an online system), and means to retrieve the most recent transaction related block from the blockchain ledger according to the incoming new transaction type (i.e., card reader or online system). In one embodiment, processing means identify untrusted transactions when data is incomplete and/or the hash provided by using the payment card does not match the expected hash which references the last transaction completed by the payment card. A mobile app may be provided for the mobile device of the payment card owner to use in the case of an online transaction or a transaction using a legacy reader to receive and store the hash referencing the block that specifies the most recent transaction completed by the payment card prior to a current transaction.

Embodiments of the present invention advantageously ensures that a payment card is an original payment card and not an authorized clone of the payment card, thereby preventing the usage of unauthorized clones of payment cards to make purchases and complete other transactions. An unauthorized clone of a payment card is prevented from completing a current transaction because the clone does not have the braille cells or randomly placed markings that are included in the original payment card, or has braille cells or markings whose data does not match the data encoded in the braille cells or the markings in the original payment card. Furthermore, a clone is prevented from completing a current transaction because the clone does not know or have access to the reference to the block in a blockchain ledger that specifies the most recent transaction completed by the payment card prior to the time of the current transaction. Embodiments of the present invention provide braille elements on payment cards that provide the advantages mentioned above while also providing visually impaired payment card owners with access to security information encoded in the braille elements.

System for Authenticating a Payment Card

Figure 1:
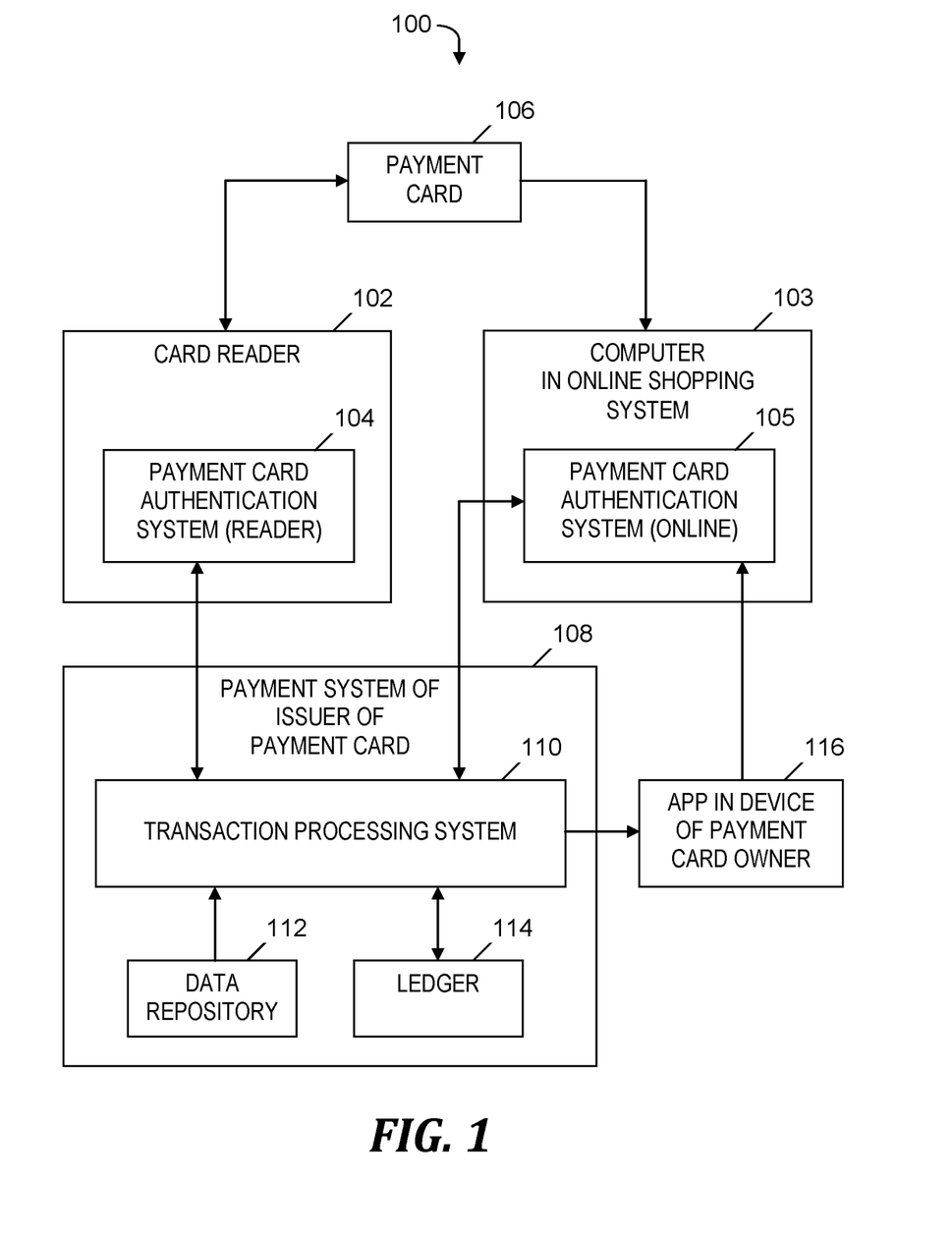
FIG. 1 is a block diagram of a system for authenticating a payment card, in accordance with embodiments of the present invention.

FIG. 1 is a block diagram of a system 100 for authenticating a payment card, in accordance with embodiments of the present invention. System 100 includes a card reader 102 and a computer 103. Card reader 102 includes a computer processor (not shown) and memory (not shown) and executes via the computer processor and memory a software-based payment card authentication system 104 that authenticates a payment card 106 that is read in card reader 102. Computer 103 executes a software application (not shown) used in an online shopping system and executes payment card authentication system 105 to authenticate payment card 106, whose data is used to initiate a purchase in an online shopping system. In one embodiment, payment card 106 is a credit card or a debit card.

Card reader 102 is a data input device that reads data encoded in a magnetic stripe and/or a computer ship embedded in payment card 106, along with a payment card identifier embossed or otherwise included on payment card 106, and a security code printed on payment card 106. Card reader 102 includes an optical component that scans the surface of payment card 106 which reads other data encoded in markings which are invisible under light in the visible spectrum and are randomly positioned on the payment card. In one embodiment, the markings are quantum dots, which are described in "Optical Storage Device Utilizing Quantum Silos," U.S. Pat. No. 9,691,482, which is hereby incorporated herein by reference, in its entirety. In one embodiment, the markings on payment card 106 included a key to decrypt data on the computer chip embedded in payment card 106, which allows card reader 102 to retrieve a hash of a block in a ledger that specifies the most recent previous transaction that utilized payment card 106. An optical component of card reader 102 reads data encoded in braille cells embossed on payment card 106. In one embodiment, the data encoded in the braille cells includes a security code.

Card reader 102 reads data from payment card 106 during a transaction and sends the data to a payment system 108 of an issuer (e.g., a bank) that issues payment card 106. Payment system 108 executes a software-based transaction processing system 110, which uses the data read from the braille cells as a frequency modifier to identify whether the transmission of the data read from payment card 106 originated in a secure system. Transaction processing system 110 validates the payment card identifier read by card reader 102 against an identifier stored in a data repository 112. Transaction processing system 110 also validates the hash read by the card reader 102 against a hash of the block specifying the most recent previous transaction that used payment card 106, where the hash of the block is stored in a ledger 114. In one embodiment, ledger 114 is a blockchain ledger.

In one embodiment, transaction processing system 110 requests a secondary validation of the transaction using payment card 106 by requesting a personal identification number (PIN) or a biometric identifier.

Transaction processing system 110 generates a new hash of a next block of ledger 114, which specifies the current transaction in which payment card 106 is being used. Card reader 102 receives and stores the new hash in the computer chip embedded in payment card 106.

In a transaction performed in an online shopping system, transaction processing system 110 performs a first level of validation by validating the identifier of payment card 106 and the security code against identifiers and security codes stored in data repository 112. The identifier and the security code being validated were received by payment card authentication system 105 being executed in computer 103. If the owner of payment card 106 is visually impaired, the aforementioned security code is provided by braille cells on payment card 106; otherwise, the security code is provided by characters printed on payment card 106.

Transaction processing system 110 performs a second level of validation by sending a hash of a block in ledger 114 specifying the most recent previous online transaction using payment card 106, where the hash is sent to an alternate means of communication that is different from the online shopping system and computer 103. In one or more embodiments of the present invention, transaction processing system 110 sends the aforementioned hash to an app 116 (e.g., an app provided by the issuer of the payment card) executed on the payment card owner's mobile device (not shown). In other embodiments, transaction processing system 110 sends the hash to the payment card owner's email address or registered web app. In one embodiment, via the app executing on the mobile device, the hash is copied to a web form that is received by computer 103 and computer 103 then sends the hash to transaction processing system 110 for validation against a hash previously stored by app 116, where the previously stored hash references the block specifying the most recent previous transaction using payment card 106. If transaction processing system 110 determines that the hash is invalid, then transaction processing system 110 denies the current transaction, thereby preventing a completion of a fraudulent purchase.

The functionality of the components shown in FIG. 1 is described in more detail in the discussion of FIG. 2, FIGS. 3A-3B, FIGS. 4A-4B, FIG. 5, FIG. 6, and FIG. 7 presented below.

Figure 2:
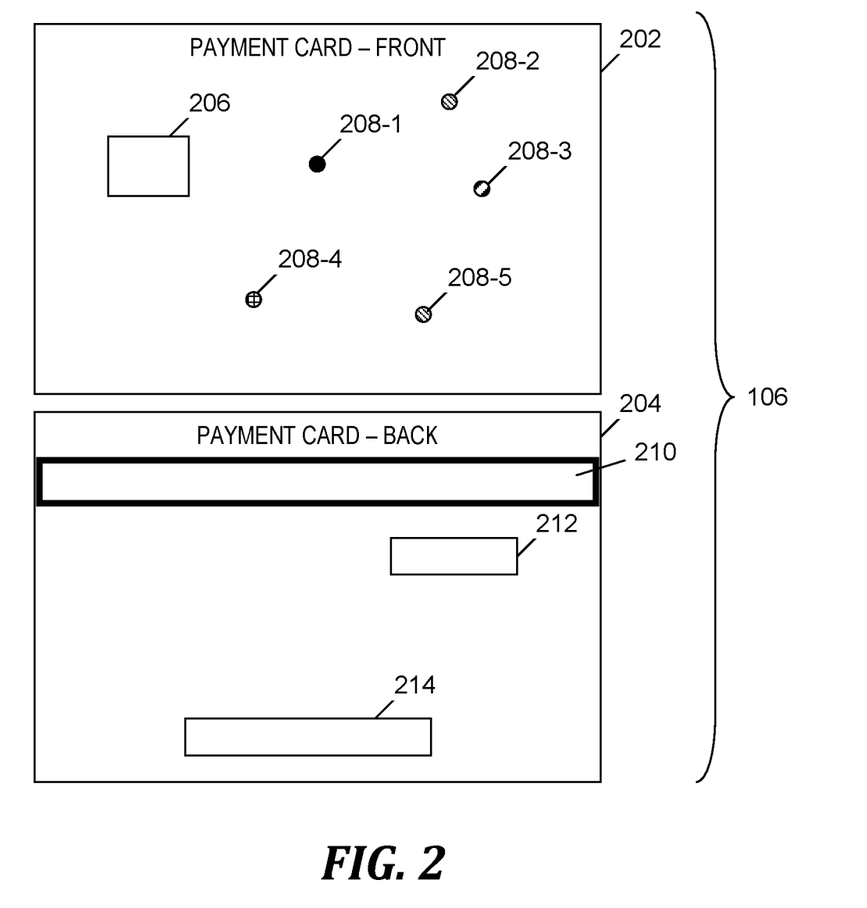
FIG. 2 is an example of a payment card authenticated in the system of FIG. 1, in accordance with embodiments of the present invention.

FIG. 2 is an example of payment card 106 authenticated in the system of FIG. 1, in accordance with embodiments of the present invention. Payment card 106 includes a front 202 of the card and a back 204 of the card. Front 202 includes a computer chip 206 (i.e., integrated circuit) embedded in payment card 106 and randomly positioned markings 208-1, 208-2, 208-3, 208-4, and 208-5. In one embodiment, computer chip 206 includes partial, encrypted information about payment card 106. In one embodiment, the markings 208-1, . . . , 208-5 include a key to decrypt the information in computer chip 206. Although five randomly positioned markings are shown in FIG. 2, embodiments of the present invention include N randomly positioned markings on payment card 106, where N is an integer greater than or equal to two. In one embodiment, the markings 208-1, . . . , 208-5 are quantum dots. In one embodiment, a random number generator (not shown) randomizes the positions of the markings on payment card 106.

Back 204 of payment card 106 includes a magnetic stripe 210, first braille cells 212, and second braille cells 214. Magnetic stripe 210 includes encrypted, partial information about payment card 106. First braille cells 212 include a security code used for validation of payment card 106. Second braille cells 214 include information about payment card 106, such as the name of the financial services entity that processes payments for purchases using payment card 106, an indication of whether payment card 106 is a credit card or a debit card, and the specific type of card that indicates features available to the owner of the payment card 106).

Processes for Authenticating a Payment Card

Figure 3A:
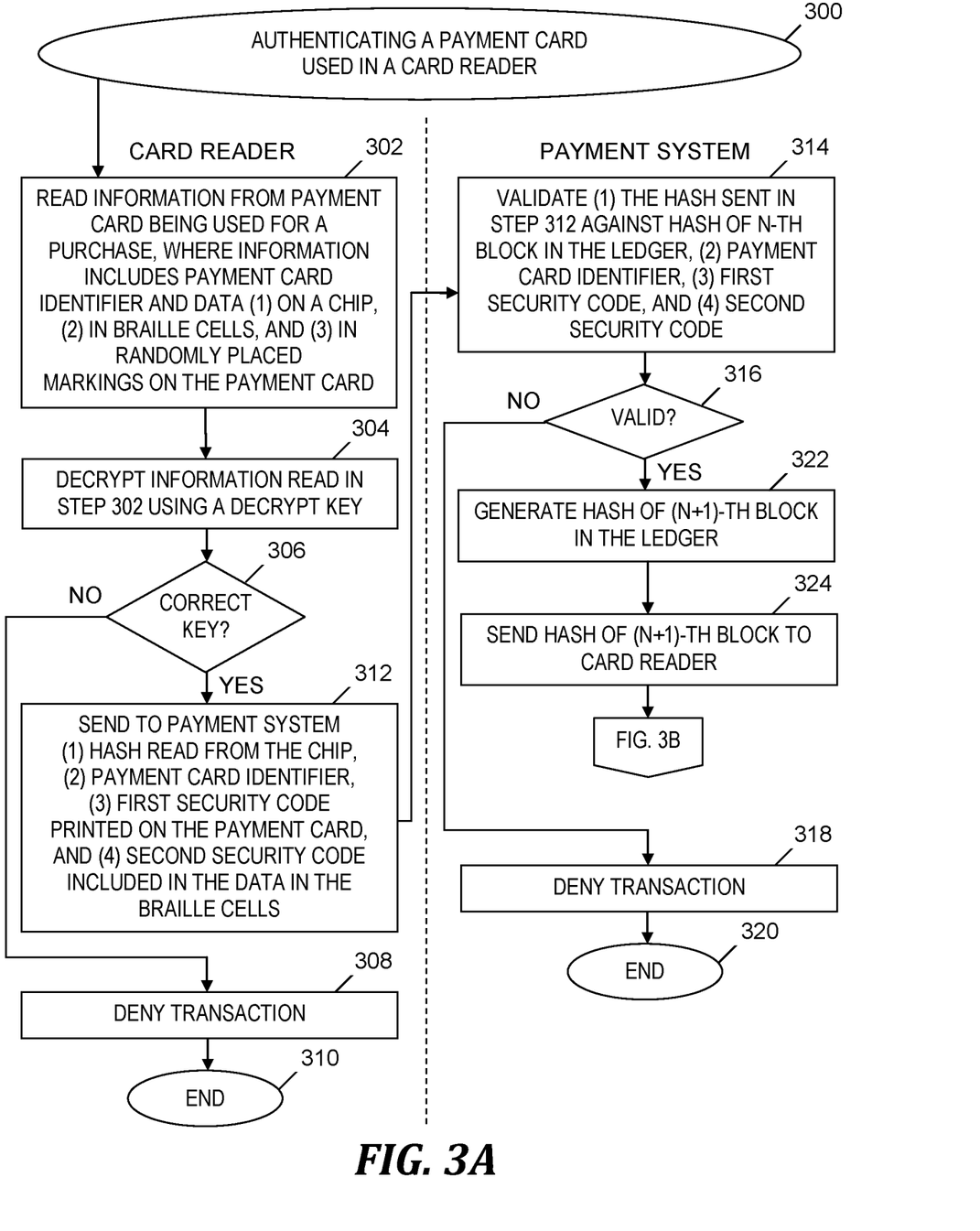
FIGS. 3A-3B depict a flowchart of a process of authenticating a payment card scanned by a card reader, where the process is implemented in the system of FIG. 1, in accordance with embodiments of the present invention.
Figure 3B:
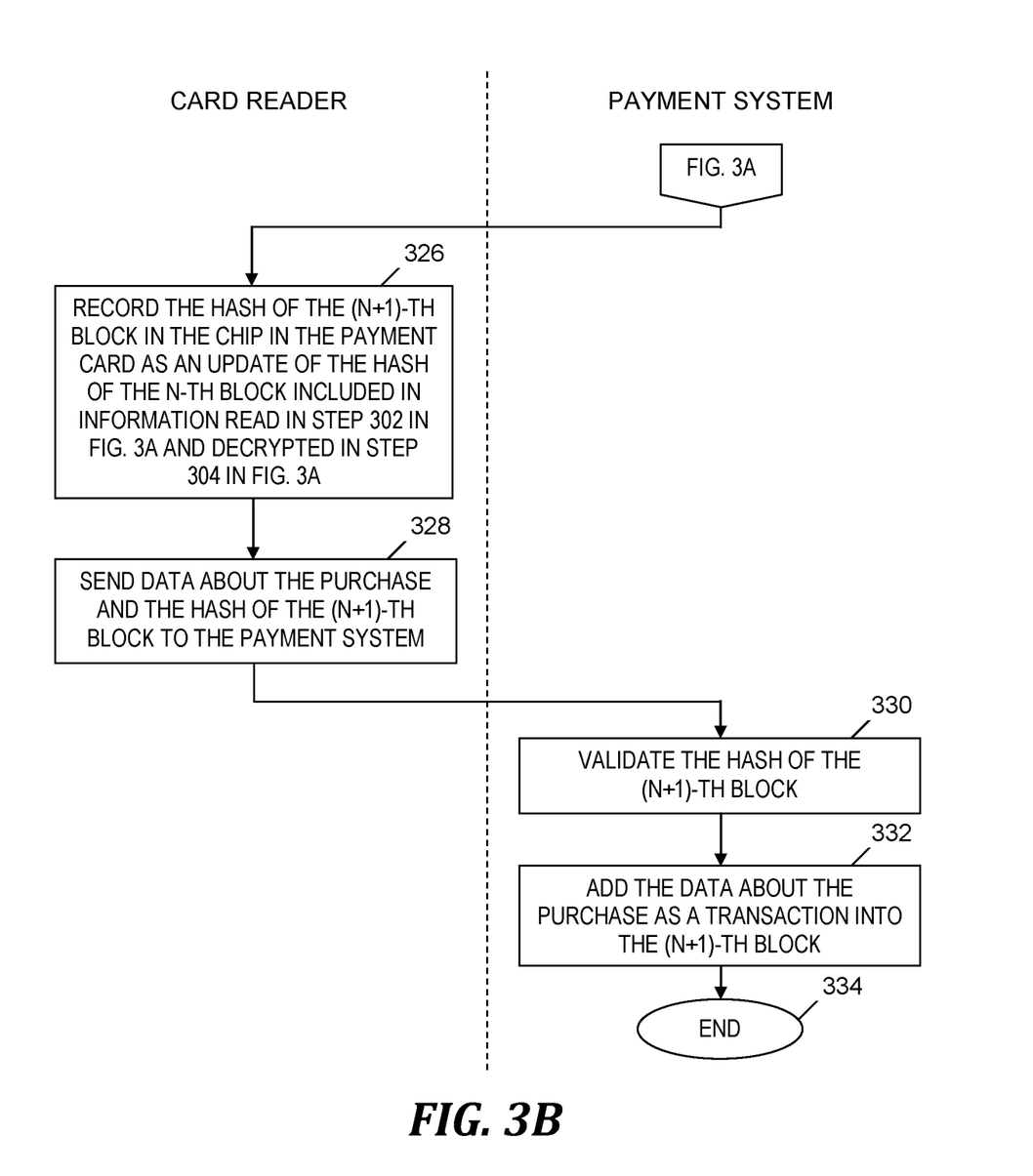

FIGS. 3A-3B depict a flowchart of a process of authenticating a payment card scanned by a card reader, where the process is implemented in the system of FIG. 1, in accordance with embodiments of the present invention. The process of FIGS. 3A-3B starts at step 300 in FIG. 3A. In step 302, payment card authentication system 104 (see FIG. 1) being executed in card reader 102 (see FIG. 1) reads information from payment card 106 (see FIG. 1), which is being used in to make a purchase in a transaction (hereinafter, the "current transaction"). The information read in step 302 includes (1) an identifier (ID) of payment card 106 (see FIG. 1) (e.g., an ID embossed on payment card 106 (see FIG. 1)), (2) encrypted data stored on a computer chip embedded in payment card 106 (see FIG. 1), (3) data encoded in braille cells on payment card 106 (see FIG. 1), and (4) data encoded in randomly positioned markings on payment card 106 (see FIG. 1).

Prior to step 304, payment card authentication system 104 (see FIG. 1) determines a decryption key included in the data encoded in braille cells read in step 302, data encoded in the markings read in step 302, or in a combination of the data encoded in the braille cells and the data encoded in the markings read in step 302. In step 304, payment card authentication system 104 (see FIG. 1) decrypts data on the computer chip, which was read in step 302, by using the decryption key.

In step 306, payment card authentication system 104 (see FIG. 1) determines whether the decryption key is correct. If the decryption key is determined to be not correct in step 306, the No branch of step 306 is taken and step 308 is performed. In step 308, payment card authentication system 104 (see FIG. 1) denies the current transaction. In step 310, the process of FIGS. 3A-3B ends.

Returning to step 306, if payment card authentication system 104 (see FIG. 1) determines that the decryption key is correct, then the Yes branch of step 306 is taken and step 312 is performed. In step 312, payment card authentication system 104 (see FIG. 1) sends to payment system 108 (see FIG. 1) of the issuer of payment card 106 (see FIG. 1) information that includes: (1) a hash read from the computer chip in step 302 and decrypted in step 304; (2) the ID of payment card 106 (see FIG. 1) that was read in step 302; (3) a first security code printed on payment card 106 (see FIG. 1); and (4) a second security code included in the data encoded in the braille cells, which was read in step 302. Payment system 108 (see FIG. 1) receives the information sent in step 312.

In step 314, payment system 108 (see FIG. 1) retrieves a hash of an n-th block from ledger 114 (see FIG. 1), which specifies the most recent previous transaction using payment card 106 (see FIG. 1), and validates the hash sent in step 312 against the retrieved hash of the n-th block. Step 314 also includes payment system 108 (see FIG. 1) validating the ID of payment card 106 (see FIG. 1) and the first and second security codes sent in step 312.

In step 316, payment system 108 (see FIG. 1) determines whether the validation in step 314 determines that payment card 106 (see FIG. 1) is a valid payment card. If payment card 106 (see FIG. 1) is determined in step 316 to be not valid, then the No branch of step 316 is taken and step 318 is performed. In step 318, payment system 108 (see FIG. 1) denies the current transaction using payment card 106 (see FIG. 1). The process of FIGS. 3A-3B ends at step 320.

Returning to step 316, if payment card 106 (see FIG. 1) is determined to be valid, then the Yes branch of step 316 is taken and step 322 is performed. In step 322, payment system 108 (see FIG. 1) generates a hash of an (n+1)-th block in ledger 114, which specifies the current transaction using payment card 106 (see FIG. 1). In step 324, payment system 108 (see FIG. 1) sends the hash of the (n+1)-th block to card reader 102 (see FIG. 1). Card reader 102 (see FIG. 1) receives the hash of the (n+1)-th block sent in step 324.

In step 326 in FIG. 3B, card reader 102 (see FIG. 1) records the hash of the (n+1)-th block in the computer chip embedded in payment card 106 (see FIG. 1) as an update of the hash of the n-th block included in information read in step 302 (see FIG. 3A) and decrypted in step 304 (see FIG. 3A).

In step 328, card reader 102 (see FIG. 1) sends (1) data about the purchase in the current transaction and (2) the hash of the (n+1)-th block to payment system 108 (see FIG. 1). Payment system 108 (see FIG. 1) receives the data and hash sent in step 328.

In step 330, payment system 108 (see FIG. 1) validates the hash of the (n+1)-th block. In step 332, payment system 108 (see FIG. 1) adds the data about the purchase as a transaction into the (n+1)-th block.

In one embodiment, an authentication of payment card 106 (see FIG. 1) for the current transaction includes a completion of step 322 in FIG. 3A and steps 330 and 332 in FIG. 3B.

The process of FIGS. 3A-3B ends at step 334.

Figure 4A:
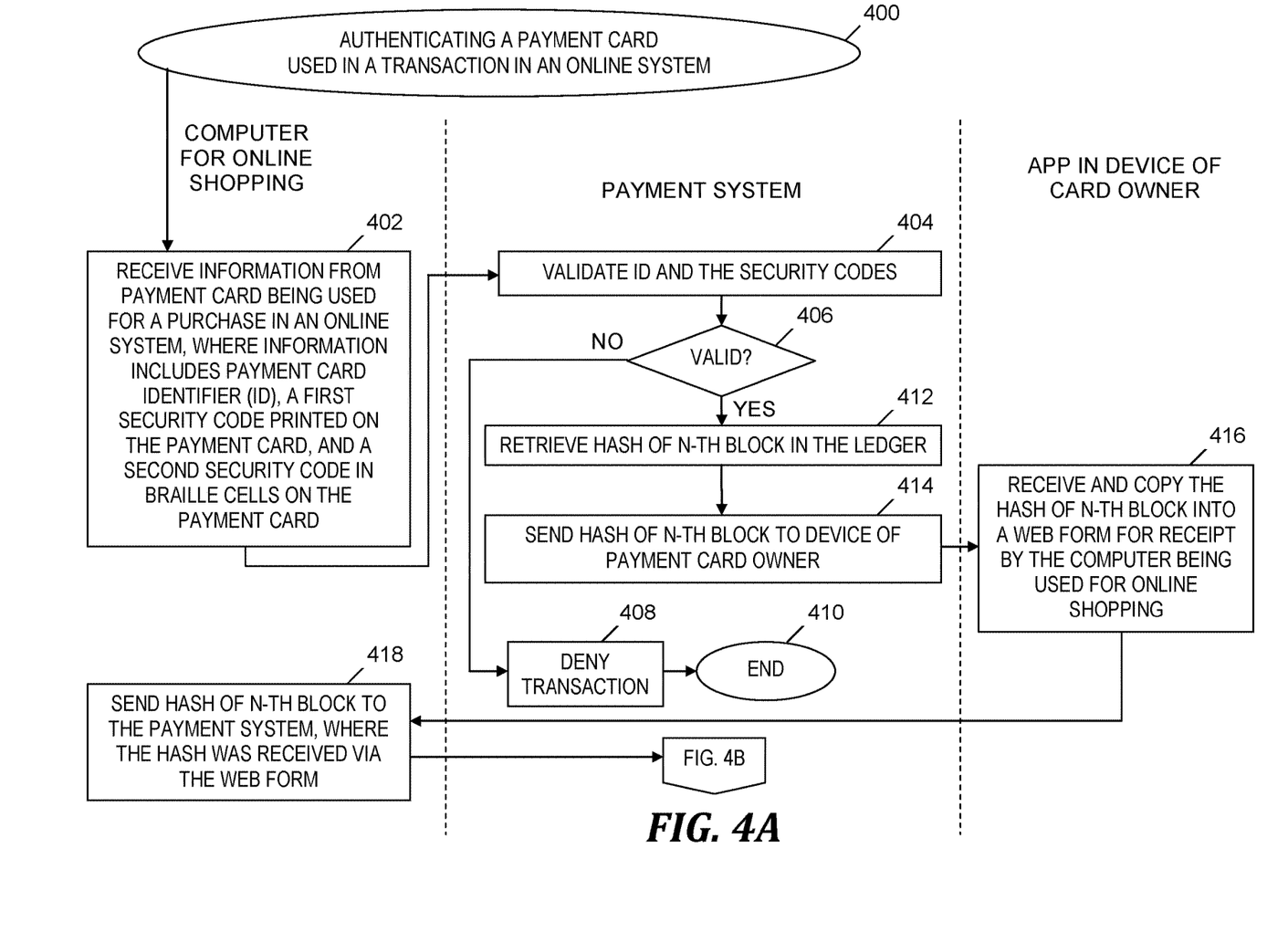
FIGS. 4A-4B depict a flowchart of a process of authenticating a payment card used in an online transaction, in accordance with embodiments of the present invention.
Figure 4B:
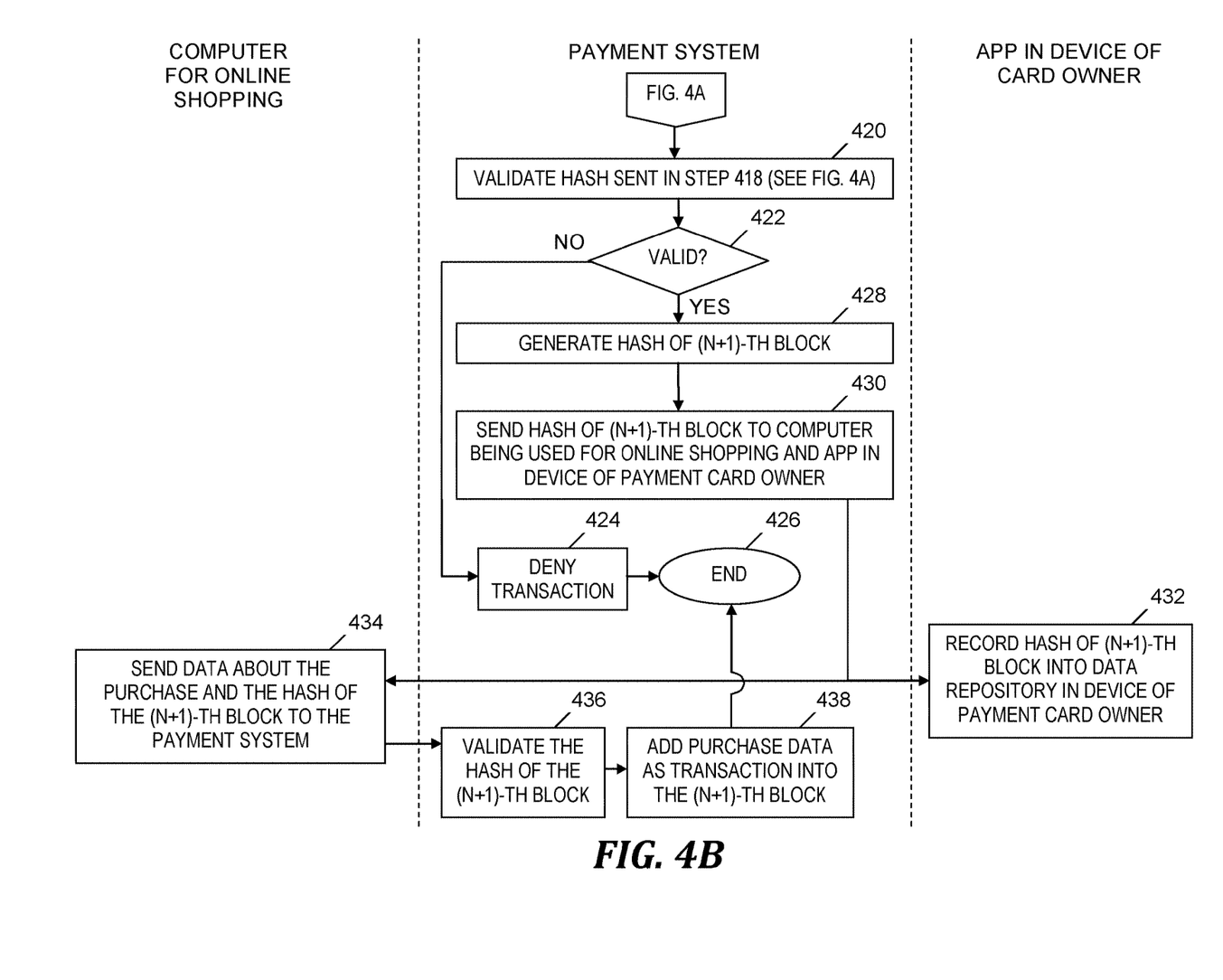

FIGS. 4A-4B depict a flowchart of a process of authenticating a payment card used in an online transaction, in accordance with embodiments of the present invention. The process of FIGS. 4A-4B begins at step 400. In step 402, payment card authentication system 105 (see FIG. 1) receives information from payment card 106 (see FIG. 1), which is being used for a purchase in an online shopping system in a current transaction. The information received in step 402 includes: the ID of payment card 106 (see FIG. 1), a first security code printed on payment card 106 (see FIG. 1), and a second security code included in braille cells on payment card 106 (see FIG. 1). After step 402 and prior to step 404, payment card authentication system 105 (see FIG. 1) sends the information received in step 402 to payment system 108 (see FIG. 1).

In step 404, transaction processing system 110 (see FIG. 1) in payment system 108 (see FIG. 1) validates the ID and the first and second security codes sent to payment system 108 (see FIG. 1) against an ID and security codes that are associated with payment card 106 and are stored in data repository 112 (see FIG. 1). In step 406, transaction processing system 110 (see FIG. 1) determines if the validation in step 404 indicates that payment card 106 (see FIG. 1) is a valid card in the current transaction. If transaction processing system 110 (see FIG. 1) determines that payment card 106 (see FIG. 1) is not valid, then the No branch of step 406 is taken and step 408 is performed.

In step 408, transaction processing system 110 (see FIG. 1) denies the current transaction. In step 410, the process of FIGS. 4A-4B ends.

Returning to step 406, if transaction processing system 110 (see FIG. 1) determines that the payment card 106 (see FIG. 1) is valid, then the Yes branch of step 406 is taken and step 412 is performed. In step 412, transaction processing system 110 (see FIG. 1) retrieves a hash of the n-th block from ledger 114 (see FIG. 1).

In step 414, transaction processing system 110 (see FIG. 1) sends the hash of the n-th block to app 116 (see FIG. 1) (e.g., a bank app) executing in the mobile device of the owner of payment card 106 (see FIG. 1).

In step 416, app 116 (see FIG. 1) receives the hash sent in step 414 and copies the hash of the n-th block into a web form for receipt by payment card authentication system 105 (see FIG. 1) being executed in computer 103 (see FIG. 1), which is being used for the current transaction. Prior to step 418, payment card authentication system 105 (see FIG. 1) receives the hash that is copied into the web form in step 416.

In step 418, payment card authentication system 105 (see FIG. 1) sends the hash of the n-th block to payment system 108 (see FIG. 1). After step 418, the process of FIGS. 4A-4B continues in FIG. 4B.

In step 420 in FIG. 4B, transaction processing system 110 (see FIG. 1) receives the hash sent in step 418 (see FIG. 4A) and validates the received hash against the hash of the n-th block stored in ledger 114 (see FIG. 1).

In step 422, transaction processing system 110 (see FIG. 1) determines whether the validation in step 420 indicates that payment card 106 (see FIG. 1) is valid. If transaction processing system 110 (see FIG. 1) in step 422 determines that the validation in step 420 indicates that payment card 106 (see FIG. 1) is not valid, then the No branch of step 422 is taken and step 424 is performed. In step 424, transaction processing system 110 (see FIG. 1) denies the current transaction. The process of FIGS. 4A-4B ends at step 426.

Returning to step 422, if transaction processing system 110 (see FIG. 1) determines that the validation in step 420 indicates that payment card 106 (see FIG. 1) is valid, then the Yes branch of step 422 is taken and step 428 is performed. In step 428, transaction processing system 110 (see FIG. 1) generates a hash of an (n+1)-th block of ledger 114 (see FIG. 1).

In step 430, transaction processing system 110 (see FIG. 1) sends the hash of the (n+1)-th block to (1) payment card authentication system 105 (see FIG. 1) being executed in computer 103 (see FIG. 1) and (2) app 116 (see FIG. 1) being executed in the mobile device of the owner of payment card 106 (see FIG. 1).

In step 432, app 116 (see FIG. 1) receives the hash of the (n+1)-th block sent in step 430 and records the hash of the (n+1)-th block into a data repository in the mobile device of the owner of payment card 106 (see FIG. 1).

In step 434, payment card authentication system 105 (see FIG. 1) sends data about the purchase in the current transaction and the hash of the (n+1)-th block to transaction processing system 110 (see FIG. 1). After step 434 and prior to step 436, transaction processing system 110 (see FIG. 1) receives the data and hash sent in step 434.

In step 436, transaction processing system 110 (see FIG. 1) validates the hash of the (n+1)-th block that was sent in step 434. In step 438, transaction processing system 110 (see FIG. 1) adds data about the purchase in the current transaction into the (n+1)-th block in ledger 114 (see FIG. 1). Following step 438, the process of FIGS. 4A-4B ends at step 426.

Examples

Figure 5:
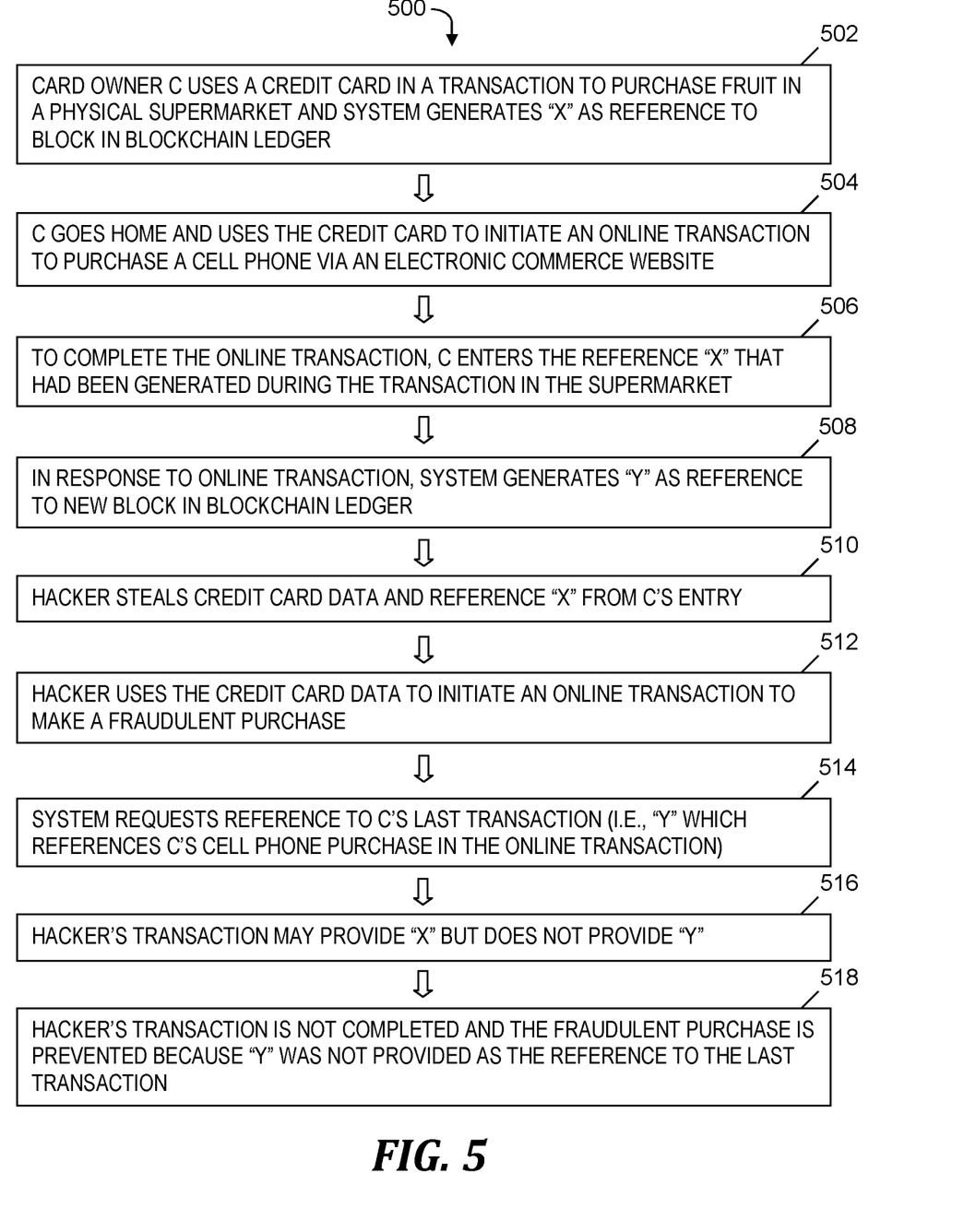
FIG. 5 is an example of using the system of FIG. 1 and the process of FIGS. 4A-4B to prevent a fraudulent purchase using stolen credit card information, in accordance with embodiments of the present invention.

FIG. 5 is an example 500 of using the system of FIG. 1 and the process of FIGS. 4A-4B to prevent a fraudulent purchase using stolen credit card information, in accordance with embodiments of the present invention. In step 502, a card owner C uses a credit card in a transaction to purchase fruit in a physical supermarket. The credit card is an example of payment card 106 (see FIG. 1). Transaction processing system 110 (see FIG. 1) generates "X" as reference to a block in a blockchain ledger (i.e., ledger 114 in FIG. 1), which specifies the transaction by which the fruit was purchased.

In step 504, C goes home and uses the same credit card to initiate an online transaction to purchase a cell phone via an electronic commerce website.

In step 506, C enters in a web form the reference "X" to complete the online transaction, where "X" had been generated during the transaction in the supermarket. Step 506 is an example of step 416 in FIG. 4A.

In step 508, in response to the online transaction, transaction processing system 110 (see FIG. 1) generates "Y" as a reference to a new block in ledger 114 (see FIG. 1), where the new block is the next block after the block referenced by "X." Step 508 is an example of step 428 in FIG. 4B.

In step 510, a hacker steals data associated with the credit card and the reference "X" from C's entry in step 506.

In step 512, the hacker uses the data associated with the credit card to initiate an online transaction to make a fraudulent purchase. Step 512 is an example of step 402 in FIG. 4A.

In step 514, transaction processing system 110 (see FIG. 1) requests the reference to C's last transaction (i.e., reference "Y" which references C's cell phone purchase in the online transaction).

In step 516, the hacker's online transaction may provide the reference to "X" (which the hacker had stolen), but does not provide reference "Y" because the hacker did not steal "Y." Step 516 is an example of steps 416 and 418 in FIG. 4A.

In step 518, transaction processing system 110 (see FIG. 1) determines that the hash sent by the hacker's online transaction does not match the reference "Y" (i.e. the reference to the last transaction performed by the card owner) and in response, denies (i.e., does not complete) the hacker's transaction and prevents the fraudulent purchase. Step 518 is an example of steps 422 and 424 in FIG. 4B.

Figure 6:
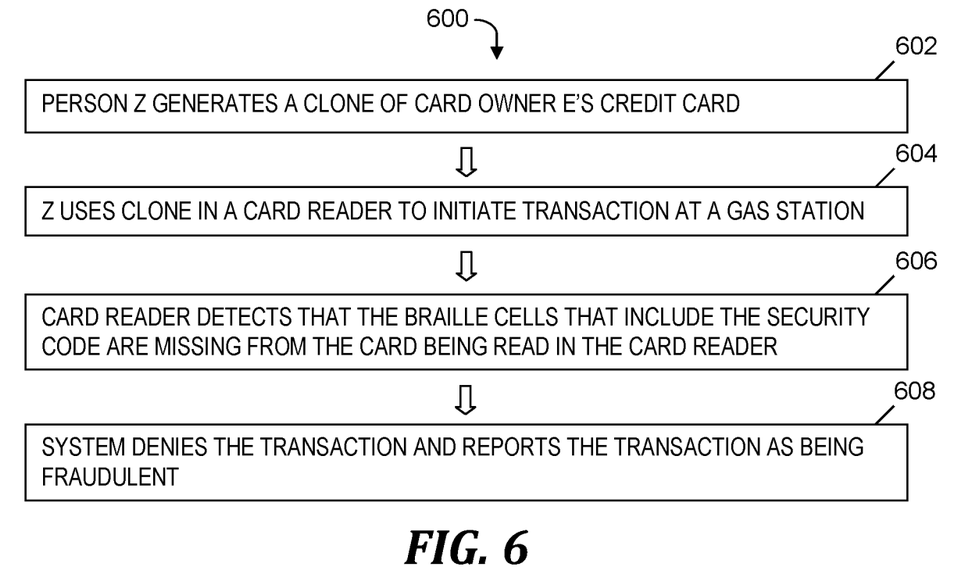
FIG. 6 is a first example of using the system of FIG. 1 and the process of FIGS. 3A-3B to prevent a fraudulent purchase using an unauthorized clone of a credit card, in accordance with embodiments of the present invention.

FIG. 6 is a first example 600 of using the system of FIG. 1 and the process of FIGS. 3A-3B to prevent a fraudulent purchase using an unauthorized clone of a credit card, in accordance with embodiments of the present invention. In step 602, person Z generates a clone of card owner E's credit card. E's credit card is an example of payment card 106 (see FIG. 1).

In step 604, Z uses the clone in card reader 102 (see FIG. 1) to initiate a transaction at a gas station.

In step 606, card reader 102 (see FIG. 1) detects that the braille cells that include the security code are missing from the clone being read in card reader 102 (see FIG. 1). Step 606 is an example of a step included in step 302 (see FIG. 3A).

In step 608, transaction processing system 110 (see FIG. 1) determines that the security code that is supposed to be included in the data in the braille cells cannot be validated because the braille cells are missing, and in response, denies the transaction at the gas station and reports the transaction as being fraudulent. Step 608 is an example of step 318 (see FIG. 3A).

Figure 7:
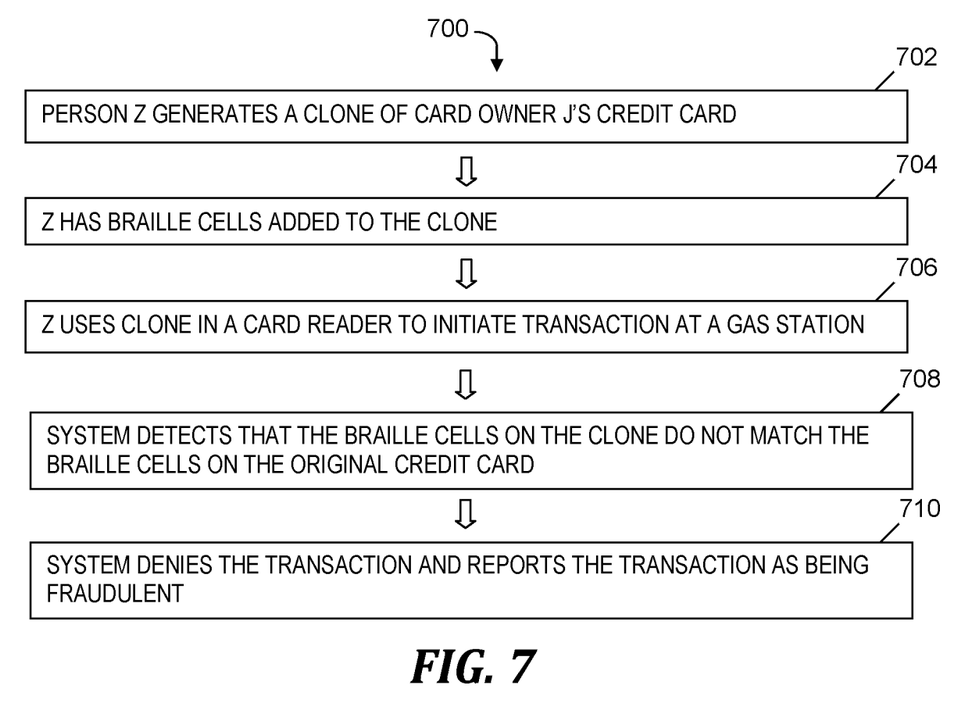
FIG. 7 is a second example of using the system of FIG. 1 and the process of FIGS. 3A-3B to prevent a fraudulent purchase using an unauthorized clone of a credit card, in accordance with embodiments of the present invention.

FIG. 7 is a second example 700 of using the system of FIG. 1 and the process of FIGS. 3A-3B to prevent a fraudulent purchase using an unauthorized clone of a credit card, in accordance with embodiments of the present invention. In step 702, person Z generates a clone of card owner J's credit card. J's credit card is an example of payment card 106 (see FIG. 1).

In step 704, Z has braille cells added to the clone. In step 706, Z uses the clone in card reader 102 (see FIG. 1). In step 708, transaction processing system 110 (see FIG. 1) detects that the braille cells on the clone do not provide a security code that matches the security code provided by the braille cells on the original credit card. Step 708 is an example of step 314 in FIG. 3A. In step 710, in response to the code in the braille cells on the clone not matching the code in the braille cells on the original credit card, transaction processing system 110 (see FIG. 1) denies the transaction at the gas station and reports the transaction as being fraudulent. Step 710 is an example of step 318 (see FIG. 3A).

Computer System

Figure 8:
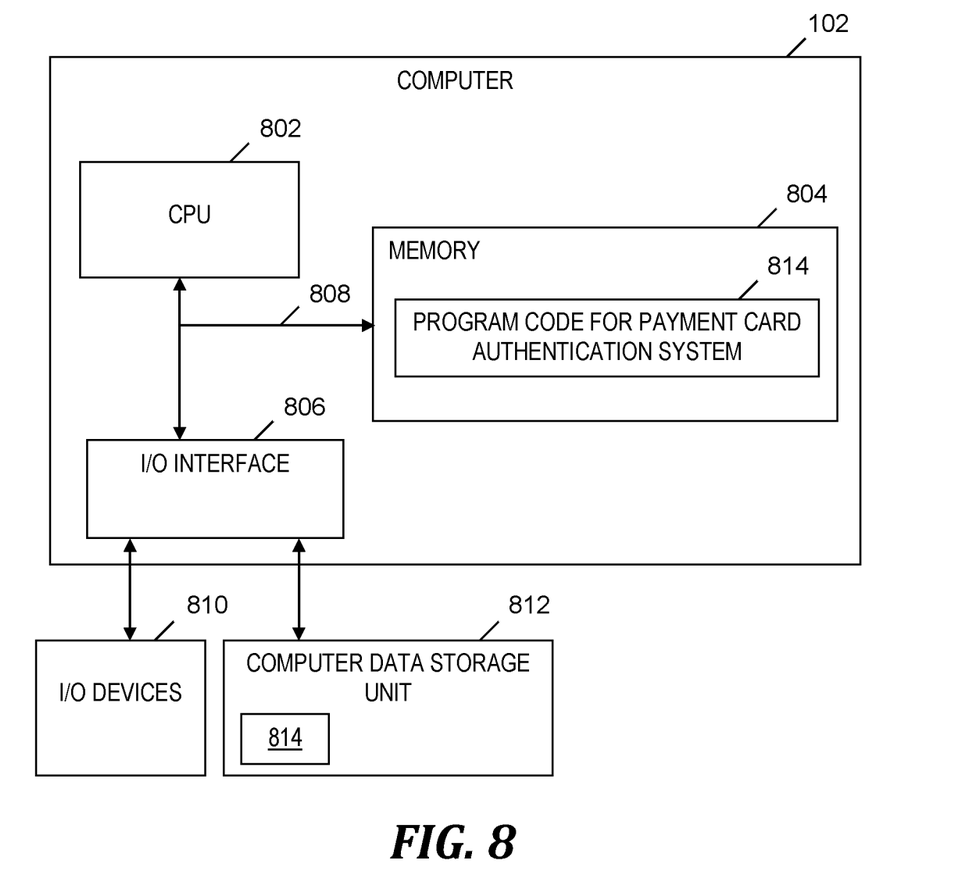
FIG. 8 is a block diagram of a computer that is included in the system of FIG. 1 and that implements the processes of FIGS. 3A-3B and FIGS. 4A-4B, in accordance with embodiments of the present invention.

FIG. 8 is a block diagram of a computer that is included in the system of FIG. 1 and that implements the processes of FIGS. 3A-3B and FIGS. 4A-4B, in accordance with embodiments of the present invention. Computer 102 is a computer system that generally includes a central processing unit (CPU) 802, a memory 804, an input/output (I/O) interface 806, and a bus 808. Further, computer 102 is coupled to I/O devices 810 and a computer data storage unit 812. CPU 802 performs computation and control functions of computer 800, including executing instructions included in program code 814 for payment card authentication system 104 (see FIG. 1) or payment card authentication system 105 (see FIG. 1) to perform a method of authenticating a payment card, where the instructions are executed by CPU 802 via memory 804. CPU 802 may include a single processing unit, or be distributed across one or more processing units in one or more locations (e.g., on a client and server). In one embodiment, computer 800 is card reader 102 (see FIG. 1) or computer 103 (see FIG. 1).

Memory 804 includes a known computer readable storage medium, which is described below. In one embodiment, cache memory elements of memory 804 provide temporary storage of at least some program code (e.g., program code 814) in order to reduce the number of times code must be retrieved from bulk storage while instructions of the program code are executed. Moreover, similar to CPU 802, memory 804 may reside at a single physical location, including one or more types of data storage, or be distributed across a plurality of physical systems in various forms. Further, memory 804 can include data distributed across, for example, a local area network (LAN) or a wide area network (WAN).

I/O interface 806 includes any system for exchanging information to or from an external source. I/O devices 810 include any known type of external device, including a display, keyboard, etc. Bus 808 provides a communication link between each of the components in computer 800, and may include any type of transmission link, including electrical, optical, wireless, etc.

I/O interface 806 also allows computer 800 to store information (e.g., data or program instructions such as program code 814) on and retrieve the information from computer data storage unit 812 or another computer data storage unit (not shown). Computer data storage unit 812 includes a known computer readable storage medium, which is described below. In one embodiment, computer data storage unit 812 is a non-volatile data storage device, such as a magnetic disk drive (i.e., hard disk drive) or an optical disc drive (e.g., a CD-ROM drive which receives a CD-ROM disk).

Memory 804 and/or storage unit 812 may store computer program code 814 that includes instructions that are executed by CPU 802 via memory 804 to authenticate a payment card. Although FIG. 8 depicts memory 804 as including program code, the present invention contemplates embodiments in which memory 804 does not include all of code 814 simultaneously, but instead at one time includes only a portion of code 814.

Further, memory 804 may include an operating system (not shown) and may include other systems not shown in FIG. 8.

Storage unit 812 and/or one or more other computer data storage units (not shown) that are coupled to computer 800 may include an identifier and security codes of payment card 106 (see FIG. 1) and data read from a computer chip embedded in payment card 106 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to authenticating a payment card. Thus, an embodiment of the present invention discloses a process for supporting computer infrastructure, where the process includes providing at least one support service for at least one of integrating, hosting, maintaining and deploying computer readable code (e.g., program code 814) in a computer system (e.g., computer 800) including one or more processors (e.g., CPU 802), wherein the processor(s) carry out instructions contained in the code causing the computer system to authenticate a payment card. Another embodiment discloses a process for supporting computer infrastructure, where the process includes integrating computer readable program code into a computer system including a processor. The step of integrating includes storing the program code in a computer readable storage device of the computer system through use of the processor. The program code, upon being executed by the processor, implements a method of authenticating a payment card.

While it is understood that program code 814 for authenticating a payment card may be deployed by manually loading directly in client, server and proxy computers (not shown) via loading a computer readable storage medium (e.g., computer data storage unit 812), program code 814 may also be automatically or semi-automatically deployed into computer 800 by sending program code 814 to a central server or a group of central servers. Program code 814 is then downloaded into client computers (e.g., computer 800) that will execute program code 814. Alternatively, program code 814 is sent directly to the client computer via e-mail. Program code 814 is then either detached to a directory on the client computer or loaded into a directory on the client computer by a button on the e-mail that executes a program that detaches program code 814 into a directory. Another alternative is to send program code 814 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 814 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of authenticating a payment card. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 804 and computer data storage unit 812) having computer readable program instructions 814 thereon for causing a processor (e.g., CPU 802) to carry out aspects of the present invention.

The computer readable storage medium can be a tangible device that can retain and store instructions (e.g., program code 814) for use by an instruction execution device (e.g., computer 800). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 814) described herein can be downloaded to respective computing/processing devices (e.g., computer 800) from a computer readable storage medium or to an external computer or external storage device (e.g., computer data storage unit 812) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 814) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIGS. 3A-3B and FIGS. 4A-4B) and/or block diagrams (e.g., FIG. 1 and FIG. 8) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 814).

These computer readable program instructions may be provided to a processor (e.g., CPU 802) of a general purpose computer, special purpose computer, or other programmable data processing apparatus (e.g., computer 800) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 812) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 814) may also be loaded onto a computer (e.g. computer 800), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of authenticating a payment card, the method comprising the steps of:

reading, by one or more processors of a card reader, information from the payment card being used for a purchase, the information including (i) an identifier of the payment card, (ii) encrypted data on a chip included in the payment card, (iii) a decryption key encoded in braille cells on the payment card, (iv) a first security code printed on the payment card, (v) a second security code encoded in the braille cells on the payment card, and (vi) data encoded in markings included in the payment card, wherein the step of reading the information includes reading, by the one or more processors of the card reader, the encrypted data on the chip and further includes reading, by an optical component included in the card reader, the decryption key, the second security code from the braille cells on the payment card, and the encoded data from the markings by scanning the payment card;

decoding, by the one or more processors of the card reader, the decryption key and the second security code;

decrypting, by one or more processors of the card reader and by using the decryption key, the encrypted data which was read by the step of reading the encrypted data, wherein the decrypted data includes a first hash;

determining, by the one or more processors of the card reader, that the decryption key is a correct key;

in response to the step of determining that the decryption key is the correct key and based on the decrypted data on the chip, sending, by the one or more processors of the card reader, to a payment system (i) the first hash, (ii) the identifier of the payment card, (iii) the first security code, and (iv) the second security code;

validating, by the payment system, the first hash sent to the payment system by matching the first hash to a hash of an n-th block of a blockchain ledger;

validating, by the payment system, the identifier of the payment card;

validating, by the payment system, the first security code;

validating, by the payment system, the second security code;

generating, by the payment system, a hash of an (n+1)-th block of the blockchain ledger; in response to the steps of validating the first hash sent to the payment system by matching the first hash to the hash of the n-th block of the blockchain ledger, validating the identifier of the payment card, validating the first security code, validating the second security code, and generating the hash of the (n+1)-th block of the blockchain ledger, sending by the payment system to the one or more processors of the card reader, the hash of the (n+1)-th block of the blockchain ledger;

recording, by the one or more processors of the card reader, the hash of the (n+1)-th block in the chip included in the payment card as an update of the hash that was read from the chip;

sending, by the one or more processors of the card reader, data about the purchase and the hash of the (n+1)-th block to the payment system;

receiving, by the payment system, data about the purchase and the hash of the (n+1)-th block;

and in response to the receiving, validating, by the payment system, the hash of the (n+1)-th block which confirms the hash of the (n+1)-th block is recorded in the chip and adding, by the payment system, the data about the purchase as a transaction into the (n+1)-th block.

2. The method of claim 1, wherein the markings include a unique pattern of quantum dots in a dye on at least a portion of the payment card, and wherein the step of decrypting the encrypted data on the chip includes, based on the decryption key, decrypting data encoded in the unique pattern of the quantum dots, the decrypted data encoded in the unique pattern of the quantum dots identifying a person to whom the payment card is issued.

3. The method of claim 1, further comprising the steps of:
reading, by the one or more processors of the card reader, second information from a second payment card being used for a second purchase, the second information including the identifier of the payment card, a second decryption key, and encrypted data on a chip included in the second payment card, wherein the step of reading the second information includes reading, by the one or more processors of the card reader, the encrypted data on the chip included in the second payment card by reading a second hash;
decoding, by the one or more processors of the card reader, the second decryption key;
decrypting, by the one or more processors of the card reader, the encrypted data on the chip included in the second payment card using the second decryption key included in the second information, wherein the step of decrypting the encrypted data on the chip included in the second payment card includes decrypting the second hash;
determining, by the one or more processors of the card reader, that the second decryption key is an incorrect key; and
in response to the second decryption key being the incorrect key, denying, by the payment system, a transaction to complete the second purchase.

4. The method of claim 1, further comprising the steps of:
reading, by the one or more processors of the card reader, second information from a second payment card being used for a second purchase, the second information including the identifier of the payment card and data on a chip included in the second payment card, wherein the step of reading the second information includes reading, by the one or more processors of the card reader, a hash from the chip included in the second payment card;
sending, by the one or more processors of the card reader, to the payment system the hash read from the chip included in the second payment card;
determining, by the payment system, that data about a most recent purchase using the payment card previous to the second purchase is stored in an m-th block of the blockchain ledger and determining, by the payment system, that the hash read from the chip included in the second payment card does not match a hash of the m-th block of the blockchain ledger; and
receiving, by the one or more processors of the card reader, from the payment system an indication that a transaction to complete the second purchase is denied in response to the steps of determining, by the payment system, that the data about the most recent purchase using the payment card previous to the second purchase is stored in the m-th block of the blockchain ledger and determining, by the payment system, that the hash read from the chip included in the second payment card does not match the hash of the m-th block of the blockchain ledger.

5. The method of claim 1, wherein the step of reading the information from the payment card includes reading the decryption key, the first security code, the second security code, and the data encoded in the markings without any portion of the decryption key, the first security code, the second security code, and the data encoded in the markings being stored in the chip or on a magnetic stripe of the payment card.

6. The method of claim 1, wherein the step of receiving from the payment system the hash of the (n+1)-th block of the blockchain ledger includes receiving the hash of the (n+1)-th block as referencing a current transaction that includes the purchase, and wherein the hash of the n-th block of the blockchain ledger references a transaction for another purchase using the payment card that is a most recent transaction using the payment card completed prior to the current transaction.

7. The method of claim 1, further comprising the steps of:
determining, by the one or more processors of the card reader, a type of the purchase that indicates using the card reader at a physical checkout;
determining, by the one or more processors of the card reader, that the n-th block indicates that a previous transaction using the payment card has a type that matches the type of the purchase; and
based in part on the n-th block indicating that the previous transaction has the type that matches the type of the purchase, identifying, by the one or more processors of the card reader, the n-th block as a most recent transaction by the payment card that is completed prior to the purchase and has the same type as the type of the purchase.

8. The method of claim 1, further comprising the step of:
providing, by the one or more processors, at least one support service for at least one of creating, integrating, hosting, maintaining, and deploying computer readable program code in the card reader, the program code being executed by the one or more processors of the card reader to implement the steps of reading the information from the payment card, decrypting the encrypted data on the chip, determining that the decryption key is the correct key, sending (i) the first hash read by the card reader, (ii) the identifier of the payment card, (iii) the first security code, and (iv) the second security code, receiving the hash of the (n+1)-th block, recording the hash of the (n+1)-th block in the chip, and sending the data about the purchase and the hash of the (n+1)-th block to the payment system.

* * * * *